United States Patent [19]
Seta

[11] 3,827,084
[45] Aug. 6, 1974

[54] UNDERCOLLAR CONSTRUCTION AND METHOD FOR MAKING SAME

[76] Inventor: Carlo N. Seta, 27457 Edgepark Dr., North Olmsted, Ohio 44070

[22] Filed: July 9, 1973

[21] Appl. No.: 377,546

[52] U.S. Cl. .................................................. 2/98
[51] Int. Cl. ............................................ A41d 1/00
[58] Field of Search .............. 2/98, 88, 87, 93, 116, 2/129, 131, 143

[56] References Cited
UNITED STATES PATENTS

| | | | |
|---|---|---|---|
| 305,143 | 9/1884 | Butterworth | 2/98 |
| 2,137,107 | 11/1938 | Beebe | 2/98 |
| 2,166,566 | 7/1939 | Giuseffi | 2/98 |
| 3,488,775 | 1/1970 | Dickenherr | 2/98 |

*Primary Examiner*—Richard J. Scanlan, Jr.
*Attorney, Agent, or Firm*—Donnelly, Maky, Renner & Otto

[57] ABSTRACT

Undercollar for a garment is drafted in such a manner as to provide a built-in crease line giving the desired length on the outer edge of the collar without requiring a plurality of pressing operations to stretch and shrink the fabric.

9 Claims, 15 Drawing Figures

PATENTED AUG 6 1974  3,827,084
SHEET 1 OF 2
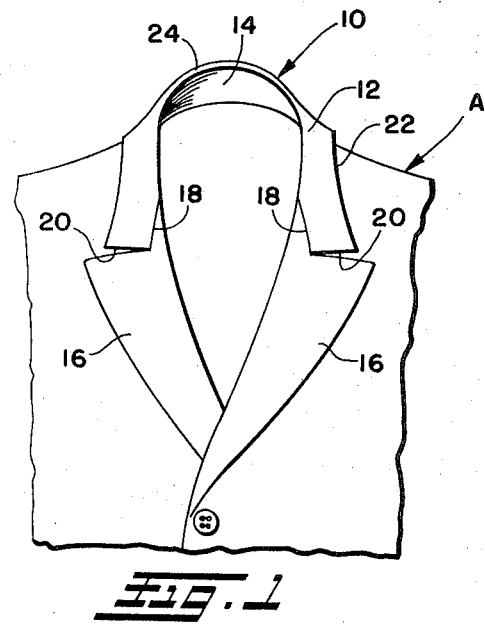
Fig. 1
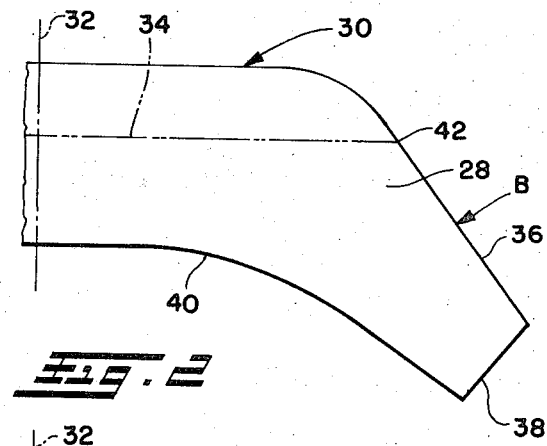
Fig. 2
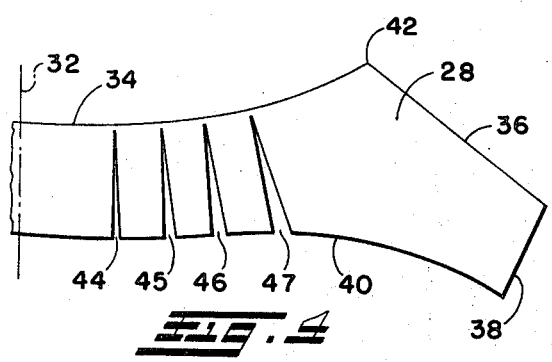
Fig. 3
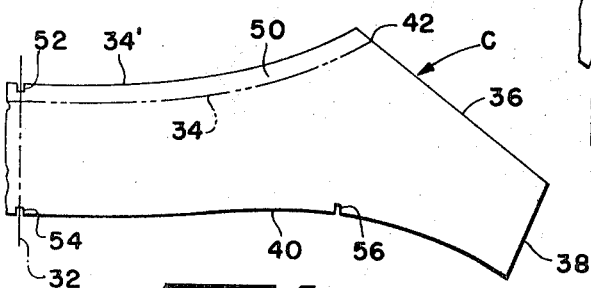
Fig. 4
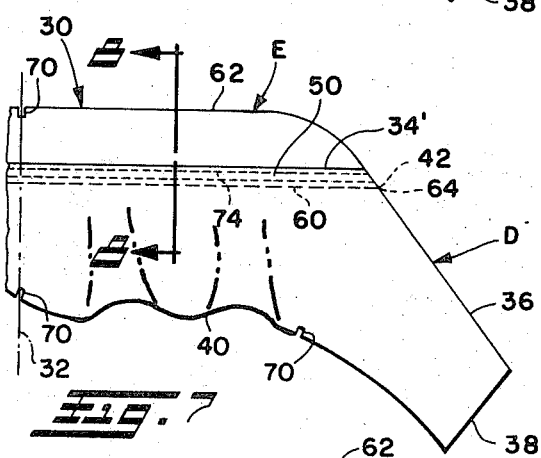
Fig. 5 / Fig. 7 / Fig. 8
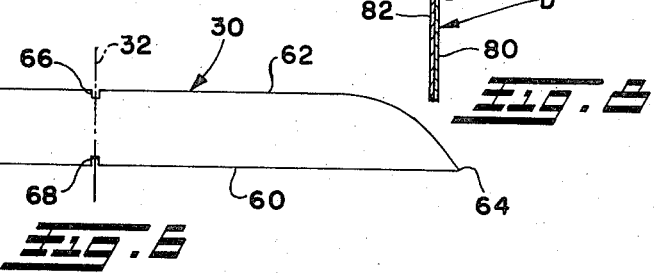
Fig. 6

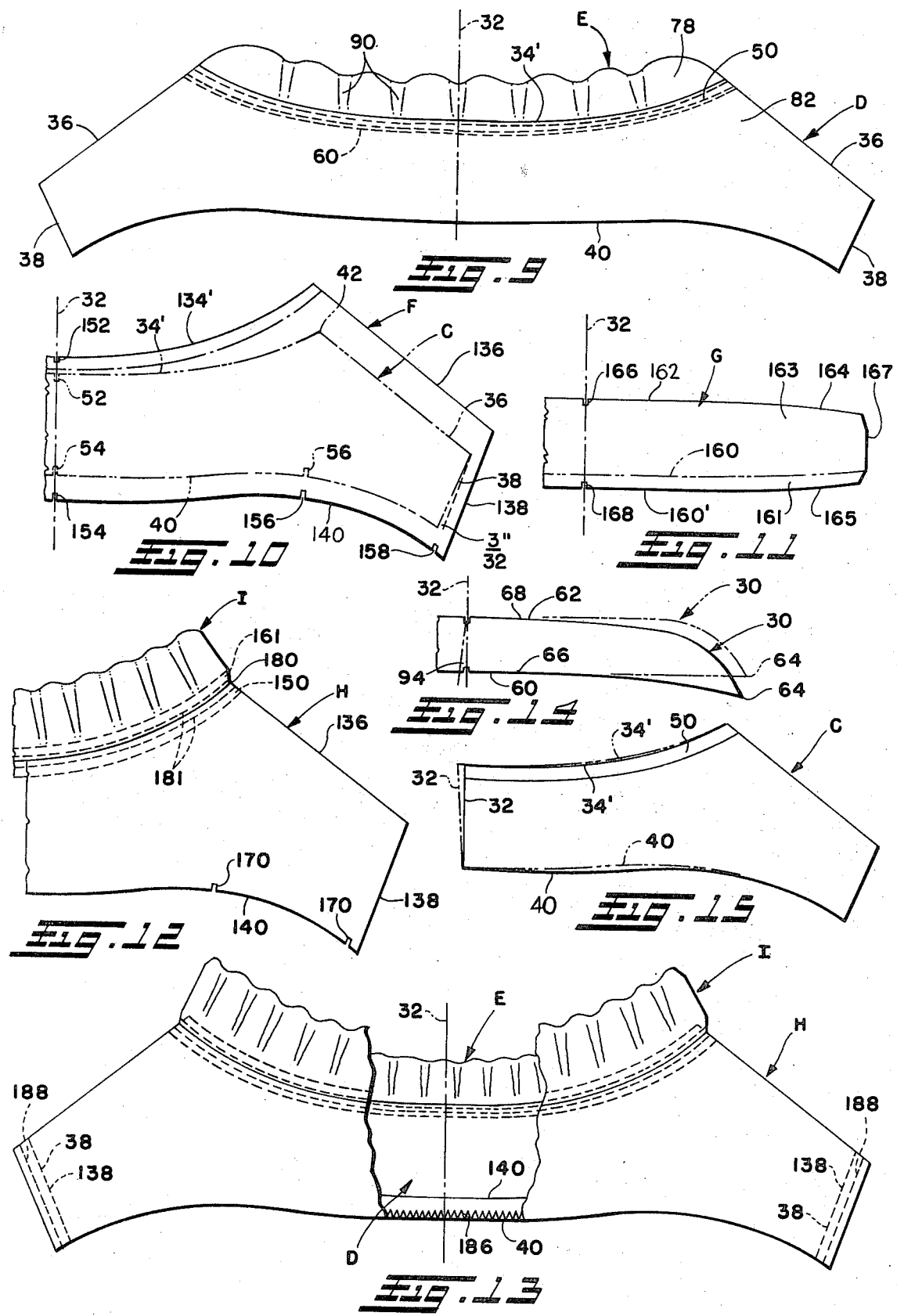

3,827,084

UNDERCOLLAR CONSTRUCTION AND METHOD FOR MAKING SAME

BACKGROUND OF THE INVENTION

This invention relates to the art of tailoring, and more particularly to tailoring of collars for garments. The invention is particularly applicable to undercollars for suit jackets, coats and other outer garments. However, it will be appreciated that the invention has broader applications and may be used for other types of collars.

In conventional procedures for making collars, a flat piece of fabric is cut to the general shape of the collar. The fabric is then folded to provide a collar stand and a collar leaf and subsequently shaped by stretching and shrinking the collar to obtain the desired length on the outside edge which will vary depending on the style of the collar. The fold line between the collar leaf and collar stand is also conventionally formed by pressing.

The necessity of stretching and shrinking a collar is very time consuming and must be done accurately in order to provide a finished collar of the desired shape.

It would be desirable to have a procedure for making collars without requiring plural pressing operations for forming a crease line between the collar stand and collar leaf, and for stretching or shrinking the fabric to the desired collar shape.

SUMMARY OF THE INVENTION

The desired final appearance of a collar and lapel is desirably sketched as it will appear on a garment. An initial flat pattern of the undercollar is then made to determine the width of the undercollar stand and undercollar leaf. The width of the undercollar stand determines how high the collar will rest on the neck of a person wearing the garment.

The initial flat pattern is made to include both the undercollar stand and undercollar leaf. The undercollar stand portion of the pattern is then separated from the undercollar leaf portion along the inner edge of the undercollar leaf or break line. A straight line is cut to perform the separation.

This leaves a draft of the undercollar leaf portion having inner, outer, end, and collar edges, along with a centerline. A plurality of spaced-apart slits are then formed in the undercollar leaf portion of the initial pattern extending from its outer edge toward its inner edge. The slits are then opened up to obtain the desired length on the outer edge outwardly from the centerline. Opening of the slits also naturally curves or shapes the outer edge smoothly inwardly and then outwardly to intersection with the end edge, while at the same time naturally curving the inner edge from the centerline smoothly outwardly to intersection with the collar edge. The number of slits and spacing may be varied depending upon the styling and size of the collar. The more slits that are made, the greater length is achieved along the outer edge of the collar leaf.

The final desired undercollar leaf pattern may then be traced from the expanded initial pattern, with the addition of a seam allowance to the inner edge of the undercollar leaf pattern.

A fabric undercollar leaf is then cut using the final desired undercollar leaf pattern. A fabric undercollar stand is also cut from the undercollar stand pattern that was originally trimmed or separated from the initial undercollar pattern. The curved inner edge of the fabric undercollar leaf is then pulled into a substantially straight line and the fabric seam allowance is lapped over the inner edge of the fabric undercollar stand so that a substantially straight seam may be sewn along this overlapped portion. This automatically provides the desired increased length in the outer edge of the undercollar leaf when the undercollar is properly folded without having to stretch and shrink the undercollar, and the edge of the seam also defines a natural break line facilitating proper folding of the undercollar. The collar may then be pressed in a single pressing operation.

The pattern for the undercollar leaf may be used to make the pattern for an outercollar leaf with suitable seam allowances being provided along all edges for the outercollar leaf. In a preferred arrangement, a plurality of notches are formed in certain edges of the under and outercollar leaf patterns to permit alignment marks to be made on the fabric at these notches for aligning the fabric of the undercollar leaf and undercollar stand when they are subsequently sewn together.

Construction of an undercollar in accordance with the present invention provides a natural fold or crease line between the undercollar leaf and undercollar stand, and also provides the desired finished length on the outer edge of the collar leaf without the need for stretching or shrinking of the fabric as is conventional practice.

With the foregoing in mind, it is a principal object of the present invention to provide an improved undercollar construction and method of making same which provides a built-in crease line giving the desired length on the outer edge of the undercollar without stretching or shrinking the undercollar as is conventional practice.

Another object is to provide an undercollar construction which permits controlled shaping of the collar to the final desired shape while being made, thereby eliminating the need for subsequent shaping of the collar and multiple pressing operations.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 1 is a front elevational view of an outer garment having the improved collar construction of the present invention incorporated therein;

FIG. 2 is a plan view of one-half of an initial undercollar pattern;

FIG. 3 is a plan view of the initial undercollar pattern of FIG. 2 subsequent to a separation and slitting operation;

FIG. 4 is a plan view of the initial pattern of FIG. 3 subsequent to an expanding operation;

FIG. 5 is a plan view of an undercollar pattern made from the expanded draft of FIG. 4;

FIG. 6 is a plan view of an undercollar stand pattern separated from the initial draft of FIG. 2;

FIG. 7 is a plan view of a two-piece undercollar formed from a fabric undercollar leaf and a fabric undercollar stand which are sewn together;

FIG. 8 is a cross-sectional view through the undercollar of FIG. 7 looking generally in the direction of arrows 8—8 of FIG. 7;

FIG. 9 is a plan view of the two-piece undercollar of FIG. 7 after completion of the sewing operations;

FIG. 10 is a plan view showing how an outercollar leaf pattern is made using the undercollar leaf pattern;

FIG. 11 is a plan view of an outercollar stand pattern;

FIG. 12 is a plan view of an outercollar fabric leaf and fabric stand sewn together;

FIG. 13 is a plan view of a completed collar constructed in accordance with the present invention, with portions of the outercollar broken away to show the undercollar therebeneath;

FIG. 14 is a plan view showing a modified undercollar stand pattern; and

FIG. 15 is a plan view showing a modified undercollar leaf pattern.

DESCRIPTION OF A PREFERRED EMBODIMENT

Referring now to the drawings, wherein the showings are for purposes of illustrating a preferred embodiment of the invention only and not for purposes of limiting same, FIG. 1 shows a garment A having a collar 10 which includes a collar leaf 12 and a collar stand 14. Lapels 16 are provided on the garment in known manner and are stitched to lapel edges 18 on collar leaf 12. Collar leaf 12 also includes end edges 20, an outer edge 22 and an inner edge generally indicated at 24.

In making a collar in accordance with the present invention, a sketch like that in FIG. 1 may first be made to determine the desired finished appearance of the collar and lapel. A flat draft of the general undercollar shape and dimensions is then drawn and cut from pattern cardboard or the like to form an initial pattern B as shown in FIG. 2. Initial pattern B includes an undercollar leaf draft portion 28 and an undercollar stand draft portion 30. The width of the undercollar leaf portion 28 may be varied depending on the desired finished style and size of the collar, and the width of the undercollar stand portion 30 may also be varied depending upon how high the tailor wants the collar to rest on a person's neck. Initial pattern B is made symmetrical about centerline 32.

The next step in drafting the undercollar is to cut the initial pattern B along a straight line 34 to separate the undercollar stand portion 30 from the undercollar leaf portion 28. Line 34 also represents the inner edge or break line undercollar leaf portion 28. Undercollar leaf portion 28 also includes a lapel edge 36, an end edge 38 and an outer edge 40. Outer edge 40 curves away from inner edge 34 in a direction extending outwardly from centerline 32 to intersection with end edge 38. Inner edge 34 intersects lapel edge 36 at an intersection point 42.

A plurality of slits 44–47 are then cut in the undercollar leaf pattern portion 28 extending in spaced-apart relationship from outer edge 40 toward inner edge 34 as shown schematically in FIG. 3. The number of slits and their spacing will depend upon the desired size and style of collar. By way of example, first slit 44 may be located approximately 1⅝ inches from centerline 32. In the arrangement shown, the further slits 44–47 are spaced apart from one another approximately ¾ inch. Slits 44–47 terminate slightly short of inner edge 34.

Slits 44–47 are then opened up as shown in FIG. 4 to produce an expanded undercollar leaf pattern. Such slits may be opened up any desirable amount depending upon the final desired style and shape of the undercollar. By way of example, slits 44–47 may be opened up along outer edge 40 as follows:

Slit 44, 1/16 inch; slit 45, 3/32 inch; slit 46, ⅛ inch; and slit 47, ¼ inch. The slits nearest lapel edge 36 are normally opened up more than the slits closer to centerline 32 since less length is required along outer edge 40 near centerline 32 than along outer edge 40 nearer to lapel edge 36 and end edge 38. In the expanded draft pattern of FIG. 4, the inner edge 34 curves smoothly away from outer edge 40 outwardly from centerline 32. Outer edge 40 desirably extends straight for a short distance from centerline 32 and then curves slightly inward toward inner edge 34, and then curves more sharply outward away from inner edge 34 to intersect end edge 38. This automatically results in a lengthening of the outer edge 40 to provide the desired length in the outer edge when the undercollar is finally formed without requiring the fabric to be stretched and shrunk as is conventional practice.

The expanded undercollar leaf pattern of FIG. 4 may then be traced on pattern cardboard or the like to produce an undercollar leaf pattern C of the desired size and shape as shown in FIG. 5. The edges of undercollar leaf pattern C in FIG. 5 have been given numerals corresponding to the corresponding edges for the expanded draft pattern of FIG. 4. As shown in FIG. 5, undercollar leaf pattern C has an extra width portion 50 added thereto beyond what was edge 34 to provide a seam allowance which terminates in inner edge 34'. In a preferred arrangement, a plurality of notches as at 52, 54 and 56 are formed in the inner and outer edges of undercollar leaf pattern C. Notches 52 and 54 in edges 34' and 40 are coincidental with centerline 32. Notch 56 is formed in outer edge 40 spaced outwardly from centerline 32 any desirable distance. Such notches may be used to provide alignment marks on the fabric for aligning the fabric during sewing in a manner to be subsequently described.

As shown more clearly in FIG. 6, undercollar stand pattern 30 is cut from pattern cardboard or the like, and includes inner and outer edges 60 and 62. The opposite end portions of outer edge 62 curve gradually to intersect inner edge 60 at end points 64. Undercollar stand pattern 30 also has notches as at 66 and 68 for chalking or cutting alignment marks on the undercollar fabric. The alignment marks may then be used to align the undercollar stand fabric with an alignment mark made on the undercollar leaf fabric, and also to align the outercollar stand fabric with the undercollar stand fabric.

Undercollar leaf pattern C and undercollar stand pattern 30 are used to cut a fabric undercollar leaf and undercollar stand. The fabric used for the undercollar should be relatively stiff, and may be cut from commercially available material of the type including an inner canvas layer sandwiched between outer felt layers. A fabric undercollar leaf and undercollar stand are represented by letters D and E in FIG. 7. Fabric undercollar leaf D is of the same size and shape as undercollar leaf pattern C in FIG. 5. Therefore, edges of fabric undercollar leaf D have been given numerals corresponding to the edges of undercollar leaf pattern C in FIG. 5. The same has been done with respect to fabric undercollar stand E. The notches in undercollar leaf pattern C and undercollar stand pattern 30 are used to make small cuts or chalk lines in fabric pieces D and E as represented by numeral 70.

Prior to sewing the undercollar leaf to the undercollar stand, the inner edge 34' of fabric undercollar leaf D is pulled into a substantially straight line, causing the outer edge 40 of the undercollar leaf D to ruffle. With inner edge 34' of fabric undercollar leaf D pulled into a straight line, the seam allowance portion 50 is lapped over inner edge 60 of undercollar stand 30. This defines an overlapping portion which is then stitched together. The dash lines in FIG. 7 represent stitches and are generally indicated by numeral 74.

For purposes of description and explanation, fabric undercollar stand E may be considered as having inner and outer surfaces 76 and 78, while fabric undercollar leaf D has inner and outer surfaces 80 and 82. With the parts stitched together as previously described, fabric undercollar leaf D may readily be folded or creased about inner edge 60 of fabric undercollar stand E so that inner surface 76 of undercollar stand E will face inner surface 80 of undercollar leaf D. In addition, the seam will also face inner surface 80 of undercollar leaf D. Seam margin portion 50 on fabric undercollar leaf D is thereby folded over back upon the main portion of undercollar stand E.

FIG. 9 shows a completed fabric undercollar constructed in the manner described. Fabric undercollar stand E will become ruffled generally indicated at 90 therein as fabric undercollar leaf D assumes its original shape subsequent to formation of the seam with inner edge 34' thereof accurately curved outwardly from centerline 32. When undercollar leaf D and undercollar stand E are folded along the natural break line 60 in the manner previously described, the ruffles 90 disappear and the completed undercollar takes on the configuration shown in FIG. 1, with sufficient length being provided in the outer edge 40 to eliminate the need for having to stretch or shrink the fabric to provide the desired length in such outer edge as is the usual practice.

In accordance with another arrangement, if it is desired to make the completed undercollar fit more snug around the neck, this may be accomplished by providing a slight curve in the break line between the undercollar leaf and undercollar stand commencing approximately 1⅜ inch from the center of the undercollar pattern while maintaining the same width of the undercollar from the center approximately 1⅜ inches in both directions. As shown in FIG. 14, centerline 32 of one-half of undercollar stand 30 may be angled to the left by a distance 94 of approximately 3/32 inch along inner edge 60 thereof. This will move outer edge 64 downwardly from the dotted line position to the solid line position. Points may then be marked on the pattern cardboard or the like corresponding to the solid line position of edge 64. The pattern is then curved between point 64 and points 66 and 68 on the inner and outer edges of the undercollar stand approximately 1⅜ inches from the centerline 32 to provide a pattern shape as shown by the solid line in FIG. 14. Such an undercollar stand will have approximately the same length along outer edge 62 thereof, but will be somewhat shorter along the inner edge or break line 60.

The undercollar leaf is similarly modified as shown in FIG. 15 by shifting centerline 32 from the shadow line position shown to the solid line position. A fabric undercollar stand and undercollar leaf cut from the patterns shown in FIGS. 14 and 15 are then sewn together in the manner previously described. Both edge 34' of the undercollar leaf and edge 60 of the undercollar stand are pulled into a substantially straight line and overlapped in the manner described with respect to FIG. 7 so that a substantially straight seam is formed. The completed undercollar still has a natural break line as previously described but will more snugly fit around the neck.

An outer or top collar leaf pattern F may be formed as shown in FIG. 10 by tracing around the undercollar leaf pattern C. Seam allowances are added outwardly from all edges of undercollar leaf pattern C. The seam allowances on the inner and outer edges of the top collar leaf pattern may be ⅜ inch more or less whereas the seam allowance at the ends may be ¼ inch more or less. The top collar leaf pattern is also desirably made approximately 3/32 inch longer than the undercollar leaf pattern at the outer edge corners only to provide for fullness of the top collar. Notches 152, 154 and 156 are formed in outercollar leaf pattern F in alignment with notches 52, 54 and 56 in undercollar leaf pattern C. Two additional notches are provided in the outer edge of the outercollar leaf stand F located approximately ¼ inch from the ends of the outercollar leaf. The top collar leaf is made wider than the undercollar to locate the seam in the neck when sewn to the undercollar so the seam doesn't show.

To make the top or outer collar stand pattern G, the pattern is cut the desired width with both edges 160, 162 being substantially straight and parallel to each other except at the ends 163 where they are slightly tapered as at 164 and 165 to obtain the lengths needed for proper spring in the outercollar. The object is to obtain the same length in the top collar stand as in the undercollar stand along the outer edge of the undercollar stand. There may be an excess along the outer edge of the top collar stand which is trimmed off to the desired seam allowance on the garment. Notches 166, 168 are provided in the center of the top collar stand pattern on both edges.

An outercollar leaf and outercollar stand may then be cut from the described patterns. A fabric outercollar leaf and outercollar stand are generally shown at H and I in FIG. 12. Leaf H and stand I are of the same shape and size as leaf pattern F and stand pattern G. Therefore, the edges of fabric outercollar leaf H and fabric outercollar stand I have been identified by the same numerals as outercollar leaf pattern F and outercollar stand pattern G. The edges of leaf H and stand I may be provided with small slits or chalk lines corresponding to the notches in leaf pattern F and stand pattern G. Leaf H and stand I are then stitched together with edges 134' and 160 pulled into substantially straight lines. With the edges pulled straight, seam margins 161 and 150 are folded back upon themselves. Leaf H and stand I are then positioned on top of one another with edges 160 and 151 following a common straight line. Stitching is then made along a substantially straight line for securing leaf H to stand I. Stand I and leaf H are then opened up so that a seam 180 is provided. Seam margins 150 and 161 lie substantially flat on the inner surface of the completed outercollar and stitching appears as indicated by dashed lines 181.

The slits or marks provided on the fabric undercollar and fabric outercollar may then be used as alignment marks when the fabric outercollar is positioned over the fabric undercollar as shown in FIG. 13. With the outercollar and undercollar positioned in overlapping relationship, the seam margin provided adjacent outer edge 140 of outercollar leaf H is folded back upon itself and positioned on top of the outer surface of undercollar D adjacent outer edge 40 thereof. This seam margin is then basted to undercollar leaf D. The under and outercollars are then turned inside out. A seam is then sewn as indicated by stitching 186 through the seam allowance provided adjacent outer edge 140 of outercollar leaf H and through undercollar leaf D adjacent outer edge 40 thereof. Outer edges 38 and 138 are also sewn together as indicated by stitching 188. The collar is then turned right side out so that end edges 38 and 138 will be inside or between inner and outercollar leafs D and H.

It will be recognized that the primary improvement of the present invention lies in the undercollar construction which provides a natural break line and permits controlled shaping of the collar to the final desired shape while being made, thereby eliminating the need for subsequent shaping of the collar by stretching and shrinking as is conventional practice.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

The embodiments of the invention in which an exclusive property or privilege is claimed are defined as follows:

1. A method of making a garment undercollar comprising the steps of forming an undercollar leaf and undercollar stand each having inner and outer surfaces and inner and outer edges, wherein the undercollar leaf is formed by drafting an undercollar leaf pattern including inner, outer, end and lapel edges and a centerline, forming a plurality of spaced-apart slits in the undercollar leaf pattern extending from the outer edge toward the inner edge thereof, forming an expanded undercollar leaf pattern by opening the slits to curve the undercollar leaf pattern inner edge away from the undercollar leaf pattern outer edge spaced from the centerline and to increase the length of the undercollar leaf pattern outer edge, using the expanded undercollar leaf pattern to determine the size and shape of the undercollar leaf, and securing the undercollar leaf and undercollar stand in the desired relation.

2. The method of claim 1 wherein the undercollar leaf and undercollar stand are secured in the desired relation by positioning the inner edges of the undercollar leaf and undercollar stand so that they overlap slightly with a portion of the inner surface of the undercollar leaf adjacent the undercollar leaf inner edge overlying a portion of the undercollar stand outer surface adjacent the undercollar stand inner edge to define an overlapped portion, and stitching the overlapped portion to provide a seam, the inner edge of the undercollar stand providing a natural break line which facilitates folding of the undercollar along the stand inner edge with the inner surfaces of the stand and leaf facing one another and with the seam facing the inner surface of the leaf, such leaf having the desired length on the outer edge of the leaf after folding of the undercollar along the natural break line without requiring a plurality of pressing operations to stretch and shrink the fabric.

3. The method of claim 2 wherein the undercollar stand is formed by drafting an undercollar stand pattern including a centerline and inner and outer edges which are made straight and parallel to each other in the region of the centerline, and slightly curved commencing approximately 1⅜ inch from the centerline to cause the undercollar stand which is cut therefrom to fit closer in the neck upon being folded along the natural break line, the inner edge of the undercollar leaf being the same length as the inner edge of the undercollar stand.

4. The method of claim 1 wherein the leaf and stand are formed by drafting an undercollar pattern including an undercollar stand pattern and such undercollar leaf pattern, and separating the undercollar stand pattern from such undercollar leaf pattern along the inner edge of such undercollar leaf pattern.

5. The method of claim 1 wherein during the formation of the expanded undercollar leaf pattern the undercollar leaf pattern outer edge is smoothly curved slightly toward the inner edge spaced from the centerline and then away from the inner edge.

6. The method of claim 1 wherein the expanded undercollar leaf pattern is traced to form a further undercollar leaf pattern, and the undercollar leaf is cut from such further undercollar leaf pattern.

7. The method of claim 6 further including the step of tracing such further undercollar leaf pattern to form an outercollar leaf pattern, adding seam allowances to the edges of the outercollar leaf pattern, forming notches in the outercollar leaf pattern aligned with notches in such further undercollar leaf pattern, cutting an outercollar leaf from the outercollar leaf pattern, forming an outercollar stand, stitching together the outercollar leaf and stand to form a fabric outercollar, positioning the undercollar and outercollar in overlapped relationship in proper alignment with each other, and stitching together the undercollar and outercollar.

8. A method of making a garment undercollar leaf comprising the steps of drafting an undercollar leaf pattern including inner, outer, end and lapel edges and a centerline, forming a plurality of spaced-apart slits in the undercollar leaf pattern extending from the outer edge toward the inner edge thereof, forming an expanded undercollar leaf pattern by opening the slits to curve the undercollar leaf pattern inner edge away from the undercollar leaf pattern outer edge spaced from the centerline and to increase the length of the undercollar leaf pattern outer edge, and using the expanded undercollar leaf pattern to determine the size and shape of the undercollar leaf.

9. The method of claim 8 wherein the expanded undercollar leaf pattern is traced to form a further undercollar leaf pattern, and the undercollar leaf is cut from such further undercollar leaf pattern traced from the expanded undercollar leaf pattern.

* * * * *